May 2, 1933. A. VAN DUYN 1,906,728
LUBRICATING MEANS FOR RODS AND THE LIKE
Filed Jan. 20, 1930
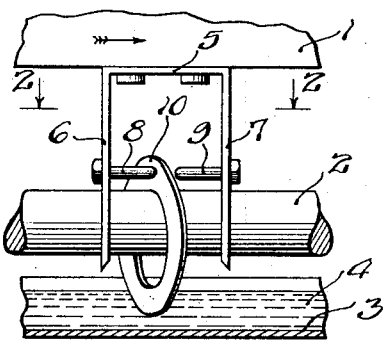
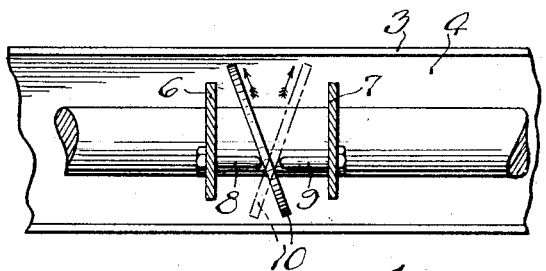
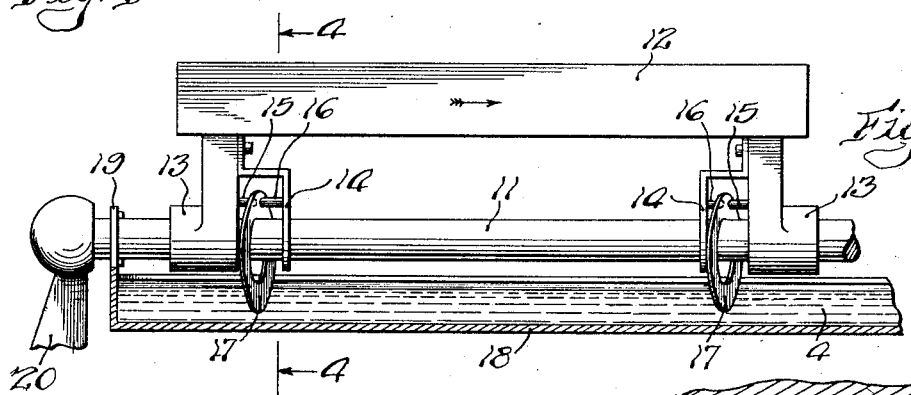
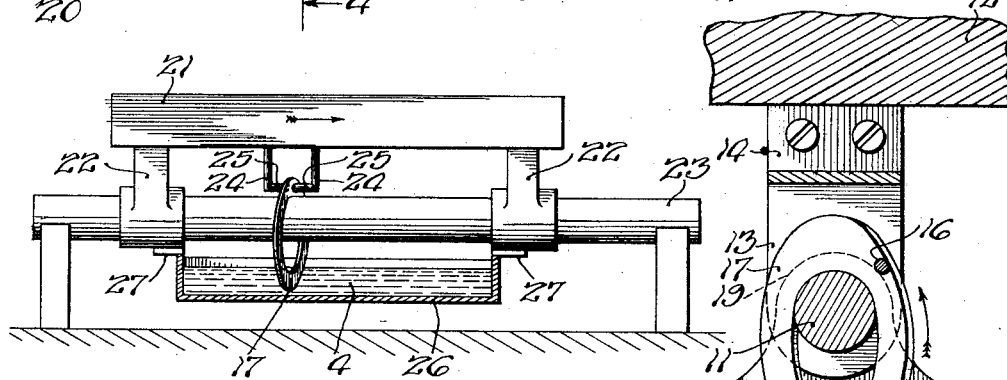
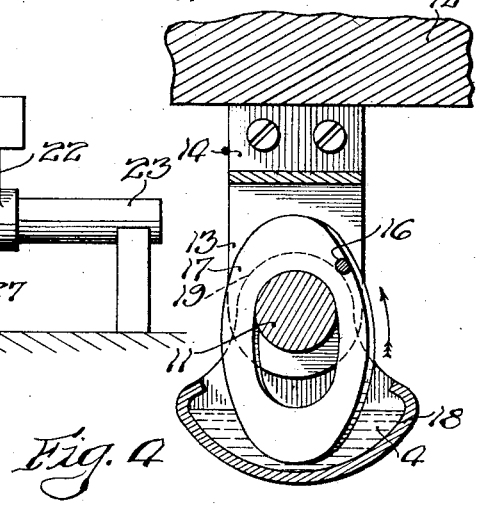
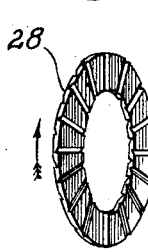
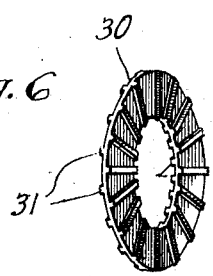

Patented May 2, 1933

1,906,728

UNITED STATES PATENT OFFICE

ADRIANUS VAN DUYN, OF ROTTERDAM, NETHERLANDS, ASSIGNOR TO U. S. SLICING MACHINE COMPANY, OF LA PORTE, INDIANA, A CORPORATION OF INDIANA

LUBRICATING MEANS FOR RODS AND THE LIKE

Application filed January 20, 1930, Serial No. 421,964, and in Great Britain January 19, 1929.

(GRANTED UNDER THE PROVISIONS OF SECTION 14, ACT OF MARCH 2, 1927, 357 O. G. 5)

The present invention relates to a lubricating means for non-rotatable parts of a machine such as guide rods and rods of a like nature and in situations in which the rods are fixed and served to guide a movable part of the machine, or where the rods reciprocate relatively to a fixed part of a machine.

One object of this invention is to provide a simple and efficient means whereby the surfaces of the rods or the like can be effectively lubricated in a simple and automatic manner.

In connection with machinery of all kinds it is important that the working parts be efficiently lubricated. Various devices and arrangements have been heretofore provided for this purpose, and among other devices it has been proposed to use a ring or rings carried on a rotating member or shaft, and which, as the member or shaft rotates, also rotates with it and raises oil from a reservoir or chamber and transfers it to the rotating member or shaft. Devices of this kind are termed "ring lubricators" and are well known for lubricating shafts, axles, spindles and other rotating members, use being made of the rotary motion thereof to turn the ring and thereby transfer the lubricant to the rotating member.

An object of this invention, however, is to provide a type of ring lubricator for lubricating a shaft which does not have a rotary motion relative to its axis, but does have a motion in the direction of its axis, or else a part supported or guided by such a rod or shaft is moved longitudinally in the direction of the axis of said rod or shaft.

Another object of this invention is to provide a ring lubricator or plurality of such lubricators which are carried loosely and slidably on the rod and while sliding are held in a tilted or oblique position relative to the axis or the rod and so that the ring as it slides along the rod, will rotate and in so doing transfer lubricant automatically from a source of supply to the surface of the rod and thereby lubricate the same. It is immaterial to this invention whether the ring be held at a relatively fixed position and tilted relatively to the axis of the rod as the rod reciprocates therein, or whether the rod is held stationary and the ring is reciprocated longitudinally thereof and tilted as it is given its longitudinal movement. It is not necessary that the rod rotate or be rotated.

A further object of this invention is to provide a lubricating means which comprises a ring or rings loosely carried on the rod to be lubricated, means being provided adjacent the rod for receiving a lubricant into which the ring or rings are dipped. Means is also provided for causing the axis of the ring to tilt angularly relative to the axis of the shaft or rod with the result that as the relative movement is given between the rod and ring, the ring, owing to the sliding friction between said ring and rod is forced to rotate slowly around the rod and in so doing to lubricate the same.

A still further object of this invention is to provide pins or the like for engaging the rings and for tilting the rings at the proper angle to cause said rings to rotate about the rod to be lubricated.

Another object of the invention will appear hereinafter, the novel features and combination being set forth in the appended claims.

In the drawing—

Fig. 1 is a fragmentary elevational view partly in section of a device embodying my invention.

Fig. 2 is a section substantially on the line 2—2 of Fig. 1.

Fig. 3 shows a modified arrangement of the device shown in Fig. 1.

Fig. 4 is a section taken substantially on the line 4—4 of Fig. 3.

Fig. 5 is still further a modification of a device embodying my invention; and

Figs. 6 and 7 represent modified forms of rings which may be used in place of the rings shown in Figs. 1 to 5, inclusive.

Referring more particularly to Figs. 1 and 2, 1 represents a reciprocating element or working part which is adapted to reciprocate relative to the rod 2, and in a direction substantially parallel thereto. A lubricating trough 3 is arranged below the rod 2 and filled with a suitable lubricant 4. The reciprocating element 1, that is a U-shaped bracket 5 having the depending arms 6 and 7, the arm 6 being provided with a pin 8, and the arm 7 being provided with the pin 9, these pins being arranged substantially in alignment with each other, as will readily be seen from inspection of Figs. 1 and 2. At least the adjacent ends of the pins are so arranged that a line between extends substantially parallel to the axis of the rod 2.

A ring 10 is loosely supported on the rod 2, and is positioned between the adjacent ends of the pins 8 and 9 so that as the reciprocating member 1 is moved relatively to the rod 2, the ring is constrained to move therewith, except for a small amount of play permitted between the ends of the pins 8 and 9.

As the reciprocating member 1 is reciprocated relatively to the rod 2, first one pin and then the other pin engages the ring 10 and moves the ring longitudinally of the rod 2. It will be noted from an inspection of Fig. 2 that the pins 8 and 9 are located to one side of a vertical plane drawn through the axis of the rod 2. This causes the pins 8 and 9 to strike the sides of the ring 10 at a point, in a horizontal direction, removed from the point of contact between the rod and the ring. This arrangement causes the ring to be tilted into either of the two positions shown in Fig. 2, the full line position illustrating the way that the ring is tilted relatively to the rod when the reciprocating member 1 is moved to the right and the dotted line position illustrating the position of the ring when the reciprocating member is moved to the left.

Let us first assume that the carriage is moving to the right. In this event the ring is tilted into the full line position shown in Fig. 2, and also the full line position shown in Fig. 1. The ring is carried longitudinally along the rod 2, and the sliding motion of the ring on the rod gives a resultant frictional force on the ring acting against this motion and in a direction substantially parallel to the rod 2. This frictional force can be resolved into two components, one perpendicular to the plane containing the ring member and causing no turning thereof, and one in the plane of said ring member, this latter component causing the ring to turn slowly about the rod 2 in the direction of the arrow shown in Fig. 2.

When the table moves to the left, the ring assumes the dotted line position shown in Fig. 2, and the same condition results as when the ring is tilted into the full line position, the resultant force tending to rotate the ring rotates the ring in the same direction as when the reciprocating member moves to the right.

The ring 10 has its lower portion extending into the lubricating trough 4, and as the ring is caused to rotate due to the relative movement between the reciprocating member 1 and the rod 2, lubricant adheres to the surfaces of the ring 10 and this lubricant is carried to the surfaces of the rod 2. The movement of the ring longitudinally of the rod 10 spreads the lubricant over a considerable portion of the rod 2, so that when the bearing members bearing on the rod 2 come into operative engagement with the lubricant, the same will be efficiently lubricated.

In the arrangement shown in Figs. 3 and 4, two rods such as the rod 11 shown therein support a table 12 which reciprocates relative to the rod 11 and has the bearings 13 in engagement with the rods. Each of the bearings 13 is provided with a bracket 14 which extends over the rod 11 in the same manner as do the arms 6 and 7 in Figs. 1 and 2. Pins 15 and 16 are connected to the bearings 13 and brackets 14 respectively. The pins 15 and 16 operate in the same manner as do the pins 8 and 9 in Figs. 1 and 2, but in this embodiment of the invention the pins are located on the opposite side of a vertical plane through axis of the rods 11, but this arrangement of the pins merely reverses the movement of the ring 17 interposed between said pins. The lubricant troughs are arranged below the rods 11 and are supported by the extensions 19 which have openings therein through which the rods 11 extend. Any other suitable means may be used to secure the trough to the guide rods. The guide rods are supported by brackets 20.

Fig. 5 shows an arrangement similar to the arrangement shown in Figs. 3 and 4. In this embodiment of the invention the table 21 is supported by the bearings 22, which are guided by and supported on the rods 23, it being understood that the other rod which is not shown is arranged in substantially parallel relation behind the rod shown. The table is provided with the downwardly extending arms 24 having the inwardly extending projection 25 which latter serve the same purpose as the pins 8 and 9 in Figs. 1 and 2, and the pins 15 and 16 in Figs. 3 and 4. In this instance, however, the lubricant trough 26 is attached directly to the bearings 22 or to any other part of the reciprocating table 21 by means of the brackets 27 and suitable fastening means for securing the brackets to the bearings. In this arrangement the extensions 25 are positioned on the same side of the guide rods as the pins shown in Fig. 3. This is an extremely simple form of the invention and, while simple performs its function in a very efficient manner and has the advantage that the oil or other lubricant in the trough does not offer any great resistance to the rotative movement of the ring 17, since if the trough were stationary as in Figs. 1 to 4, inclusive, the ring has to be dragged through the lubricant and this may have a tendency to prevent rotative movement of the ring.

It will be understood, of course, that if desired the rods 2, 11 and 23 may be reciprocated and the reciprocating members 1, 12 and 21 may be held stationary without departing from the spirit or scope of this invention, the action of this improved lubricating means depending for its action only upon the relative movements in a longitudinal direction of the various parts.

Where the motion of the working parts is reciprocatory and the paths of the two bearings overlap, the ring can be located between these bearings and it is then actuated by a pin or the like on each bearing in turn in the overlapping portion of the path.

In order to change the direction of the turning of the ring member, all that is necessary is to place the actuating ring or the like on the opposite side of a vertical plane through the guide rod axis than that illustrated in the drawing. If the pins or the like are placed in a quadrant on the same side of the aforementioned vertical plane the direction of turning of the ring remains unaltered.

While I have illustrated pins for engaging the ring and for actuating the same, I wish to have it understood that instead of pins I may provide the brackets with struck up lugs, or any other suitable form of abutment members which will serve the purpose of the pins.

In Figs. 6 and 7, I have illustrated two different types of rings which may be used for the same purposes as the rings 10 and 17 shown in Figs. 1 to 5, inclusive.

In Fig. 6, the ring 28 is provided with a plurality of depressions 29 shown greatly exaggerated in the drawing, these depressions being for the purpose of increasing the amount of lubricant carried from the lubricant trough to the surface of the guide rod.

In Fig. 7, the ring 30 is provided with a series of projections 31 extended radially from the center of the ring and these projections accomplish substantially the same results as the depressions shown in the ring 28. The projections 31 may be spaced apart as much or as little as desired, and the height thereof from above the surface of the ring may be regulated to suit various requirements. The drawing shows the projections and depressions of considerable dimensions, but it will be understood that these are shown exaggerated merely for the purpose of illustration, and may be made small enough so as not to interfere with the operation of the pins which engage the ring and tend to rotate the same. The staggered relation of the projections and depressions on the rings 30 and 28 respectively enables the device to operate even though the projections and depressions temporarily limit the rotation of the rings when engaged by a projection on one side thereof, since when the projections engage the other side of said rings a further amount of movement will be given to said ring even though as before the amount of this movement will be limited by the projections or depressions. In other words even though the projections and depressions are of considerable height or depth as the case may be, they do not interfere with the rotation of the rings.

Obviously those skilled in the art may make various changes in the details and arrangement of parts without departing from the scope of this invention as defined by the claims hereto appended, and I wish therefore not to be restricted to the precise construction herein described.

Having thus fully disclosed several embodiments of my invention, what I desire to secure by Letters Patent of the United States is:—

1. In a lubricating device the combination with a rod to be lubricated, of a member guided by said rod, a ring surrounding said rod, a lubricant trough beneath said rod and adapted to receive lubricant to a level which will cause said ring to be partially immersed in said lubricant, and a means on said member for tilting said ring out of its normal plane and for carrying said ring along said rod so that said ring will rotate about said rod due to the reaction between said ring and said rod, said ring having its annular portion substantially flat in a plane perpendicular to its axis and having grooves therein at opposite sides of said flat portion staggered with respect to each other so as not to interfere with the rotation of said ring about said rod by the means on said member which causes rotation of said ring about said rod.

2. In a lubricating device the combination with a rod to be lubricated, of a member guided by said rod, a ring surrounding said rod, a lubricant trough beneath said rod and adapted to receive lubricant to a level which will cause said ring to be partially immersed in said lubricant, and a means on said member for tilting said ring out of its normal plane and for carrying said ring along said rod so that said ring will rotate about said rod due to the reaction between said ring and said rod, said ring having spaced projections on opposite sides thereof staggered with respect to each other.

3. In a lubricating device, the combination with a rod to be lubricated, of a member guided by said rod, a ring surrounding said rod, a lubricant trough beneath said rod adapted to receive lubricant to a level which will cause said ring to be partially immersed in said lubricant, and a means on said member for tilting said ring out of its normal plane and for carrying said ring along said rod so that said ring will rotate about said rod due to the reaction between said ring and said rod while said ring moves therealong, each of the opposite sides of said ring having alternate raised and depressed portions, the raised portions on opposite sides thereof being staggered with respect to each other.

In testimony whereof I have signed my name to this specification on this 3rd day of January A. D. 1930.

ADRIANUS van DUYN.